Patented June 12, 1951

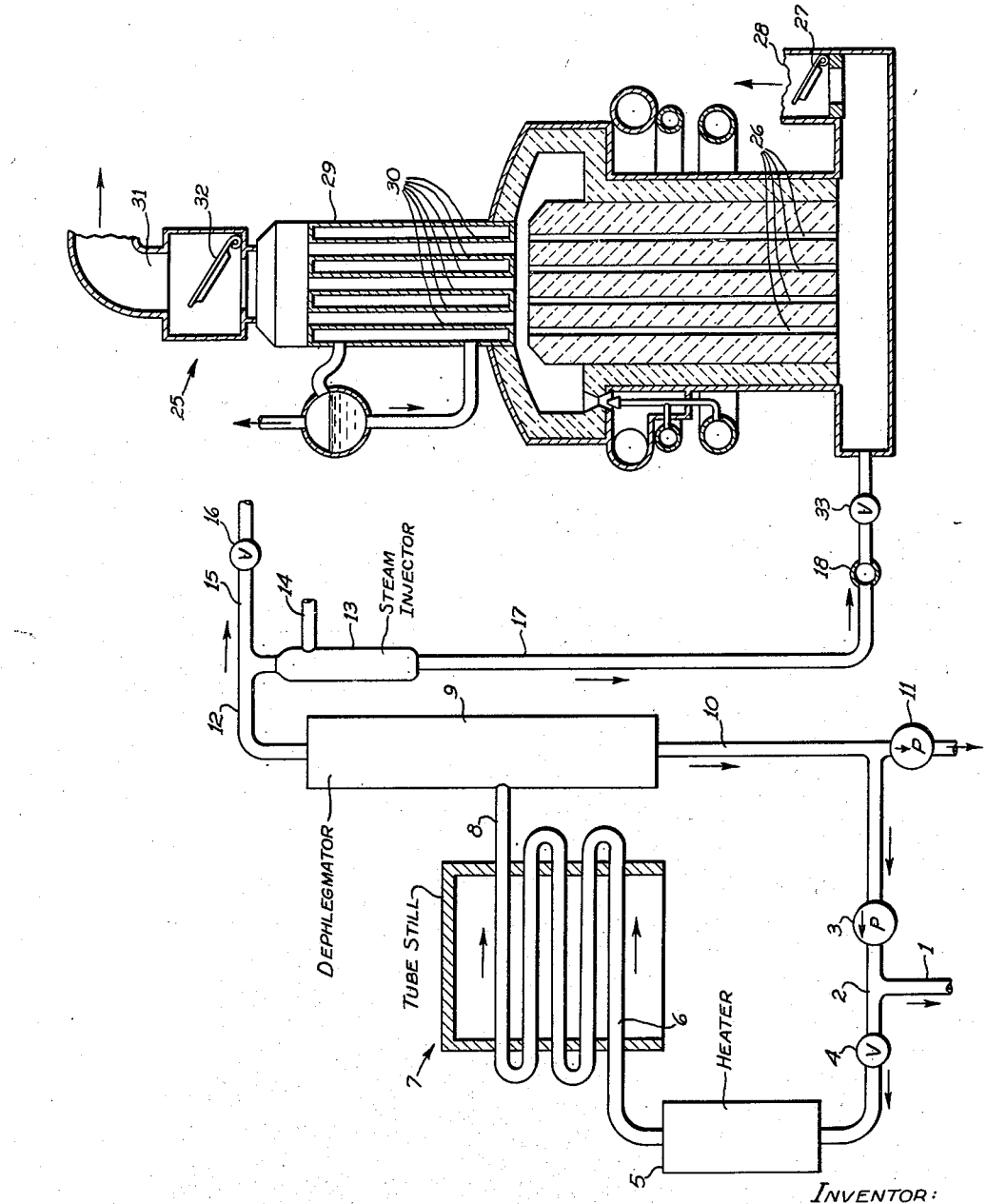

2,556,424

UNITED STATES PATENT OFFICE 2,556,424

APPARATUS FOR PRODUCING ACETYLENE

Rudolph Leonard Hasche, Johnson City, Tenn., assignor, by mesne assignments, to Eastman Kodak Company, Rochester, N. Y., a corporation of New Jersey Original application December 10, 1945, Serial No. 634,047. Divided and this application September 14, 1946, Serial No. 697,149

3 Claims. (Cl. 23—277)

This application is a division of my copending application Serial No. 634,047, filed December 10, 1945, entitled "Process of Producing Acetylene," now Patent No. 2,518,688.

Acetylene may be produced from suitable charging stock, hereinafter called a first gas, by subjecting the first gas to temperatures above 1500° F. at subatmospheric pressures. The acetylene as produced may be carried in a mixed gas containing other hydrocarbon gases and hydrogen, such a mixed gas in the process disclosed herein being called a fourth gas. A suitable charging stock, or first gas, is preferably one that contains a saturated hydrocarbon or hydrocarbons, such as ethane, propane, or butane. I have discovered that the conversion of such saturated hydrocarbons to acetylene takes place in two stages, certain components of the first gas being first converted into unsaturated hydrocarbons containing more hydrogen than acetylene. These hydrocarbons, hereinafter called hydrocarbons which readily form acetylene, can then be converted to acetylene. If the first gas is heated to a temperature at or below 1500° F. at subatmospheric pressure, for example, at an absolute pressure of 250 mm. of mercury or less, a second gas is formed which contains substantial amounts of intermediate hydrocarbons which readily form acetylene. By "substantial amounts" of any component of any gas, I mean that the component has a volume equal to at least two per cent of the total volume of the gas.

If this second gas is then heated above 1500° F. at subatmospheric pressure, the intermediate hydrocarbons which readily form acetylene are converted to acetylene. This conversion can be accomplished if the second gas is diluted by an inert diluent gas to form a third gas, and the third gas is heated to a temperature above 2000° F. at or near atmospheric pressure, the dilution causing the intermediate hydrocarbons readily forming acetylene to be under a subatmospheric partial pressure due to the presence of the diluent. By "inert diluent" I mean a gas which does not readily react with the hydrocarbons to form undesirable products. Steam may be considered to be such a gas, but hydrogen or methane may be used.

It is an object of my invention to provide a process by which a first gas containing unsaturated hydrocarbons is converted into a fourth gas containing substantial amounts of acetylene which has been formed from said intermediate hydrocarbons, and to provide an apparatus in which said process may be conducted.

It is a further object of my invention to provide a process in which said first gas is first heated to a temperature below 1500° F. at subatmospheric pressure to produce a second gas containing substantial amounts of intermediate hydrocarbons which readily form acetylene, this second gas is diluted with an inert diluent to form a third gas, and this third gas is heated at or near atmospheric pressure to produce a fourth gas containing substantial amounts of acetylene, and to provide an apparatus in which such a process may be practiced.

It is a further object of my invention to provide a process in which I remove from the second gas some hydrocarbons which do not readily form acetylene, before diluting said second gas to form the third gas, and to provide an apparatus in which such removal can be conducted.

It is a further object of my invention to provide a process in which the hydrocarbons which do not readily form acetylene, which are removed from the second gas, are returned to the first gas so that they can be reheated to form hydrocarbons which readily form acetylene.

A suitable charging stock, or first gas, may be ethane, propane, butane, or any of the lighter saturated hydrocarbons except methane, or any mixture of hydrocarbons containing said lighter hydrocarbons, such, for example, as the vapors or gas produced by heating natural gasoline.

Further objects and advantages will be made evident hereinafter.

The drawing is an elevation, partly in section, on a vertical plane, of an apparatus suited to carry on my process, well known apparatus being shown diagrammatically.

The charging stock is delivered through a pipe 1 to a pipe 2, where it may be mixed with recirculating stock delivered by a pump 3 to the pipe 2 to form a first gas. A pressure regulating valve 4 is provided in the pipe 2 for the purpose of maintaining a subatmospheric pressure beyond this valve. If natural gasoline or other hydrocarbon, or hydrocarbon mixture, which is a liquid at atmospheric temperatures and pressures is used as a charging stock, the charging stock is first delivered to a heater 5 where it is vaporized, the vapors being passed to a coil 6 in a tube still 7 as the first gas. The coil 6 of the tube still 7 is preferably made of a chromium alloy, or other material having high mechanical strength at high temperatures, and is heated externally, preferably by combustion products. The charging stock in the coil 6 is preferably subjected to a temperature below 1500° F. and a pressure of about 250 mm. of mercury, or below, whereby a portion thereof is converted into hydrocarbons which readily form acetylene. The mixture of gases so formed is hereinafter called the second gas, and it is then delivered from the coil 6 to a pipe 8 and contains substantial amounts of hydrocarbons which readily form acetylene.

The pipe 8 delivers the hot gases to a dephlegmator or bubble tower 9 of conventional construction, where the gases are cooled and fractionated, the products boiling at temperatures below a predetermined value being delivered as a gas to a pipe 12, and the products boiling above this value being delivered as a liquid to a pipe 10. In general, it may be said that all hydrocarbons that boil only at a critical temperature or above are rejected as a liquid through the pipe 10 and may be returned to the pipe 2 by the pump 3 or drawn off through a pump 11. The hydrocarbons which boil below said critical temperature are carried by the pipe 12 to the inlet of an injector 13. Low boiling point hydrocarbons derived from the process are delivered through a pipe 15 and through a pressure reducing valve 16 to the inlet of the injector 13, which is supplied with a motive gas through a pipe 14.

If the first gas is of such a nature that the second gas is predominantly hydrocarbons which readily form acetylene, the dephlegmator 9 may be omitted, and all of the second gas may be passed directly to the injector 13. Where the second gas contains less than ten per cent by volume of acetylene-forming hydrocarbons, it will increase the capacity and efficiency of the process if some of the hydrocarbons which will not readily form acetylene are taken out of the second gas in the dephlegmator 9. The critical temperature of the dephlegmator 9 is a temperature substantially below that at which all of the acetylene-forming hydrocarbons boil at the pressure maintained in the second gas, which may be around 250 mm. of mercury. It is desirable that the gas leaving the dephlegmator 9 through the pipe 12 contain all the acetylene-forming hydrocarbons, and the process is operative if this gas contains a considerable proportion of other hydrocarbons.

The injector 13 has a triple function: It produces and maintains subatmospheric pressures in the coil 6 and thus assists in the conversion taking place therein; it produces a pressure slightly above atmospheric pressure in the outlet pipe 17; and it dilutes with an inert diluent the gases delivered to the injector 13, thus reducing the partial pressure of these gases during later steps of the process so that they may be processed at subatmospheric partial pressures, although the mixture of gases in which they are carried is at about atmospheric pressure. Gases from the injector 13 pass from the pipe 17 to a manifold 18, which feeds two or more regenerative furnaces.

I may conveniently use natural gas under pressure to operate the injector 13, delivering this gas through the pipe 14, or methane, hydrogen, or any gases other than those which, like oxygen, react undesirably with hydrocarbons. Any hydrocarbon gas or mixture of such inert gases under pressures substantially above atmospheric which do not so undesirably react may, in fact, be used as a motive gas and diluent in the injector 13. Natural gas, which itself contains hydrocarbons which can be converted into acetylene or ethylene in subsequent steps of the process, is in some respects better than steam as a motivating gas delivered to the injector through the pipe 14. The process will, however, be described as if steam were used, since such steam is readily available, being produced, as will hereinafter be described, in the process.

The gas leaving the injector 13 through the pipe 17 is referred to herein as the third gas. It consists of acetylene-forming hydrocarbons and hydrocarbons that do not readily form acetylene, diluted with steam or other inert diluent.

It is desirable to use a plurality of regenerative furnaces, as these operate on an intermittent cycle, and it is desirable that the apparatus previously described operate continuously. Accordingly, it is desirable to have at least one of the regenerative furnaces receiving gas from the manifold 18 continuously, which can be accomplished by having two or more furnaces, one being heated, or regenerated, while another is treating gas from the manifold 18.

It is, of course, understood that the process operates automatically and periodically through a fixed cycle which is governed by a continuously operated timer.

The regenerative furnaces 25 are each of the form shown diagrammatically in the drawing, and they each operate on a recurring cycle consisting of a heating period of perhaps 1½ minutes, a purging period of ½ minute or less, and a flow period of perhaps 1 minute. The regenerative mass of the furnaces may be similar in construction and method of operation to that shown in my copending application Serial No. 592,102, filed May 5, 1945, now Patent No. 2,473,427.

As shown in the drawing, the regenerative furnace 25 comprises a regenerative mass which may be formed of Carborundum brick so laid as to form vertical primary passages 26. During the heating period, the regenerative mass is heated by gases of combustion passed downwardly through the passages 26 and delivered through a valve 27 to a stack 28. During the purging period, the passages 26 are cleared of combustion products by steam or other purging agent, which is blown therethrough. At the end of the purging period, the top of the regenerative mass may be at a temperature of 3000° F. or below, the temperature maintained depending upon the characteristics of the charging stock, the product desired, and the maximum temperature at which the regenerative mass may be safely operated.

Operating on a suitable charging stock, such as natural gas or gasoline, the gas leaving the passages 26 during the flow period will contain substantial amounts of acetylene, and it will be hereinafter called the fourth gas. In general, the higher the temperature of the mass, the greater the proportion of acetylene that will be found in the fourth gas. The temperature of the mixed gas leaving the passages 26 may be as high as 2800° F.

At high temperatures acetylene is unstable, and if it is maintained for a period of several seconds at high temperatures, acetylene decomposes into constituents which in the process of the present invention it is not desirable to produce. It is therefore essential that the gases pass upwardly through the passages 26 very quickly and be then quickly cooled, for example, to a temperature of 900° F. or below, being at decomposing temperature only a fraction of a second. To insure quick cooling, I place directly above the regenerative mass a fire tube boiler 29 having secondary passages 30. During the firing period, hot fourth gas from the primary passages 26 passes directly into the secondary passages 36 of the boiler, wherein it is cooled by water surrounding the passages 30, and then passes to a pipe 31 through a valve 32. The valve 32 is open during flow periods and closed during purging and heating periods.

From the pipe 31 the gases which may be cooled to 900° F. or below are passed to conventional apparatus (not shown) where the desired constituents are separated from the mixture by any well known means. Acetylene is thus recovered, thereby accomplishing one of the desired objects of the invention. Some ethylene and other hydrocarbons having a higher boiling point than acetylene may also be recovered, and any portion of the mixed gas which is not otherwise used may be returned for reprocessing, for example, through the pipe 15 into the injector 13. An automatically operated valve 33 is provided to shut off the flow of gas from the manifold 18 during the heating and purging periods, this valve being open only during the flow period.

In operation, the tubular coil 6 may be safely operated continuously at any pressure below atmospheric at temperatures below 1500° F., but it is not practicable to operate the regenerative furnace at any substantially subatmospheric pressure during the treating period, since during the heating period the furnace must be operated at atmospheric pressure or above, and frequent large changes in pressure are destructive to the regenerative mass. Therefore, the coil 6 should be operated under pressures substantially below atmospheric, and the regenerative furnace should be operated at a pressure as close as practicable to atmospheric, and with as little change as possible in the pressure prevailing therein. This pressure must, however, be sufficient to drive the gases rapidly through the regenerative mass.

The acetylene-forming gases are reasonably stable at 1500° F., which may be the maximum temperature to which they are subjected in the coil 6. The length of time the first gas remains in the coil is not a critical factor in operation, and it may be left therein long enough to obtain a good conversion ratio. Acetylene, however, is quite unstable at temperatures below 2800° F., which is about the maximum temperature to which the gas may be heated in the regenerative furnace with readily available materials, and the length of time the acetylene remains at this temperature should be reduced as much as is practicable. In practice I have found that the total time that the gases should be left at temperatures above 150° F. should not be more than $\frac{1}{10}$ second.

I have described the apparatus herein disclosed as used to convert saturated hydrocarbons into unsaturated hydrocarbons for convenience in description and to illustrate one use to which the apparatus may be applied. As to the claims, I specifically rely on the rule of law under which an inventor is given rights to use apparatus for all purposes to which it may be applied.

I claim as my invention:

1. An apparatus combination particularly adapted for the conversion of saturated hydrocarbons to acetylenic hydrocarbons which comprises in combination a tube furnace having an inlet and exit and a regenerative furnace having a primary space, a conduit for the hydrocarbon to be processed leading to the inlet of the tube furnace, heater means encircling at least a part of this conduit, the tube furnace being made up of a furnace enclosure containing said tubes, the tubes being of a chromium alloy construction whereby the tube furnace will withstand relatively high temperatures, a dephlegmator in connection with the exit from the tube furnace, the dephlegmator also being connected with the conduit aforementioned whereby material uncracked in the tube furnace may be separated and recycled to the tube furnace, a steam injector connecting the upper portion of the dephlegmator with the primary space of said regenerative furnace, said regenerative furnace comprising an outer shell containing an elongated upright regenerative mass having passageways extending lengthwise therethrough, said primary space in direct communication with said passageways at the end of said regenerative mass, the exit from the steam injector aforementioned leading into this primary space, a chamber surrounding the other end of the regenerative mass forming a substantially annular combustion space about the end position of said regenerative mass and a throat constituting a communication between said combustion space and a space adjacent to the end of said mass into which said passageways open, a plurality of burners opening into said annular combustion space and a heat exchange means embracing tubular passageways disposed in a casing, said casing being positioned in communicative contact with said regenerative mass and adapted to receive fluid for heat exchange with the gases flowing through said tubular passageways from said regenerative mass.

2. An apparatus combination particularly adapted for the conversion of saturated hydrocarbons to acetylenic hydrocarbons which comprises in combination a tube furnace having an inlet and exit and a regenerative furnace, feed conduit for the hydrocarbon to be processed leading to the tube furnace, the tube furnace being made up of a furnace enclosure containing said tubes, the tubes being of a construction whereby the tube furnace will withstand relatively high temperatures, a dephlegmator in connection with the exit from the tube furnace, the dephlegmator also being connected with the feed conduit aforementioned whereby certain of the materials separated in the dephlegmator may be recycled to the inlet, a steam injector connecting the upper portion of the dephlegmator with one end of said regenerative furnace, said regenerative furnace comprising an outer shell, an elongated upright regenerative mass having passageways extending lengthwise therethrough, a chamber surrounding the end, opposite the end where the injector is connected, of the regenerative mass forming a substantially annular combustion space about this end of said regenerative mass and a throat constituting a communication between said combustion space and a space adjacent to the end of said mass into which said passageways open, a plurality of burners opening into said annular combustion space and a heat exchange means embracing tubular passageways enclosed in a casing, said casing being positioned in communicative contact with said regenerative mass and adapted to receive fluid for heat exchange with the gases flowing through said tubular passageways from said regenerative mass.

3. An apparatus particularly adapted for the conversion of saturated hydrocarbons to acetylenic hydrocarbons which comprises in combination a tube furnace having an inlet and exit and a regenerative furnace, a feed conduit for the hydrocarbon to be processed leading to the tube furnace, heater means encircling at least a part of the feed conduit, the tube furnace being made up of a furnace enclosure containing said tubes, a dephlegmator in connection with the exit from the tube furnace, a steam injector connecting the head portion of the dephlegmator with the lower end of said regenerative furnace, said regenerative furnace comprising an outer shell enclosing an elongated upright regenerative mass having passageways extending lengthwise therethrough, a chamber surrounding one end of the regenerative mass forming a substantially annular combustion space about the end position of said regenerative mass and a throat constituting a communication between said combustion space and a space adjacent to the end of said mass into which said passageways open, a plurality of burners opening into said annular combustion space and a heat exchange means embracing tubular passageways enclosed in a casing, said casing being positioned in communicative contact with said regenerative mass and adapted to receive fluid for heat exchange with the gases flowing through said tubular passageways from said regenerative mass.

RUDOLPH LEONARD HASCHE.

REFERENCES CITED

The following references are of record in the file of this patent:

UNITED STATES PATENTS

| Number | Name | Date |
| --- | --- | --- |
| 341,622 | Archer | May 11, 1886 |
| 1,053,074 | Vuilleumier | Feb. 11, 1913 |
| 1,228,818 | Pictet | June 5, 1917 |
| 1,651,115 | Clark | Nov. 29, 1927 |
| 1,868,462 | Huff | July 19, 1932 |
| 2,091,375 | Pyzel | Aug. 31, 1937 |
| 2,352,755 | McAfee | July 4, 1944 |

FOREIGN PATENTS

| Number | Country | Date |
| --- | --- | --- |
| 382,620 | Great Britain | Oct. 24, 1932 |